United States Patent
Bruhn

(10) Patent No.: US 8,898,060 B2
(45) Date of Patent: Nov. 25, 2014

(54) SOURCE CODE ADAPTION BASED ON COMMUNICATION LINK QUALITY AND SOURCE CODING DELAY

(75) Inventor: Stefan Bruhn, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 266 days.

(21) Appl. No.: 13/582,122

(22) PCT Filed: Mar. 2, 2010

(86) PCT No.: PCT/SE2010/050241
§ 371 (c)(1),
(2), (4) Date: Aug. 31, 2012

(87) PCT Pub. No.: WO2011/108964
PCT Pub. Date: Sep. 9, 2011

(65) Prior Publication Data
US 2012/0323568 A1    Dec. 20, 2012

(51) Int. Cl.
*G10L 19/02* (2013.01)
*H04L 29/06* (2006.01)
*G10L 19/18* (2013.01)
*G10L 19/12* (2013.01)
*G10L 19/22* (2013.01)
*G10L 19/24* (2013.01)
*H04M 7/00* (2006.01)

(52) U.S. Cl.
CPC ............. *H04L 65/607* (2013.01); *G10L 19/18* (2013.01); *G10L 19/12* (2013.01); *G10L 19/22* (2013.01); *G10L 19/24* (2013.01); *H04M 7/0072* (2013.01); *H04L 65/602* (2013.01); *H04L 65/80* (2013.01)
USPC ........................................................ 704/221

(58) Field of Classification Search
USPC .................................................. 704/219–230
See application file for complete search history.

(56) References Cited

U.S. PATENT DOCUMENTS 5,970,443 A * 10/1999 Fujii ............................. 704/222
6,216,107 B1 * 4/2001 Rydbeck et al. .............. 704/500

(Continued)

FOREIGN PATENT DOCUMENTS

| EP | 1059782 A2 | 12/2000 |
|---|---|---|
| WO | 0178430 A | 10/2001 |
| WO | 03019961 A | 3/2003 |

OTHER PUBLICATIONS

Telecommunications Industry Assoc., "Telecommunications—IP Telephony Equipment—Voice Quality Recommendations for IP Telephony", TSB-116-A, Mar. 2006, p. 53, Table 7.
Pereira, W., "Modifying LPC Parameter Dynamics to Improve Speech Coder Efficiency", Dept. of Electrical & Computer Engineering, McGill University, Montreal, Canada, Sep. 2001, 113 pages.

(Continued)

*Primary Examiner* — Abul Azad
(74) *Attorney, Agent, or Firm* — Rothwell, Figg, Ernst & Manbeck, P.C.

(57) ABSTRACT

Method and arrangement in a network node for adapting a property of source coding to the quality of a communication link in packet switched conversational services in a communication system. The method comprises obtaining (404) information related to the quality of a communication link. The method further comprises selecting (406) a source coding mode with an associated source coding delay, based on the obtained information and the associated source coding delay. The selected source coding mode is selected from a set of at least two source coding modes associated with different source coding delays, and is to be used when source coding voice data to be transmitted over the communication link.

30 Claims, 5 Drawing Sheets

(56) References Cited

U.S. PATENT DOCUMENTS

| | | |
|---|---|---|
| 7,002,992 B1 | 2/2006 | Shaffer et al. |
| 2004/0081106 A1* | 4/2004 | Bruhn .......................... 370/276 |
| 2005/0136959 A1* | 6/2005 | Hellwig et al. ............... 455/522 |
| 2007/0091815 A1 | 4/2007 | Tinnakornsrisuphap et al. |

OTHER PUBLICATIONS

International Telecommunication Union, "Frame error robust narrow-band and wideband embedded variable bit-rate coding of speech and audio from 8-32 kbit/s", Recommendation ITU-T G.718, Jun. 2008, pp. 170-171.

* cited by examiner

SOURCE CODE ADAPTION BASED ON COMMUNICATION LINK QUALITY AND SOURCE CODING DELAY

CROSS-REFERENCE TO RELATED APPLICATION

This application is a 35 U.S.C. §371 National Phase Entry Application from PCT/SE2010/050241, filed Mar. 2, 2010, and designating the United States.

TECHNICAL FIELD

The invention relates to source coding of voice data in conversational services in a communication system, and especially to delay introduced by a source codec.

BACKGROUND

End-to-end delay has a limited time budget in conversational applications, such as telephony. An end-to-end delay exceeding a certain limit will have a negative effect on conversational quality. Therefore it is desirable to keep the end-to-end delay within said certain limit.

The end-to-end delay is the sum of a number of different delays, associated with different parts of the end-to-end communication chain. For example, the end-to-end communication chain typically comprises, besides the actual propagation through a medium, different successive elements, such as source coding, packetizing, channel coding, interleaving, retransmissions and jitter buffering. Each of these elements requires some processing time at their disposal, in order to achieve proper operation of the respective element, such as good source coding efficiency or a reliable transmission over a communication link with only few transmission errors or frame/packet losses. Since end-to-end delay is a restricted resource, there is only a limited amount of time, which can be distributed among the different elements of the end-to-end communication chain.

Before transmitting voice data over a communication link, the voice data is source coded. Typically, source coding is performed in order to compress a sequence of data, in order for it to require, e.g., less transmission bandwidth. Source coding of voice data introduces a source coding delay component in end-to-end delay in conversational services. The length of the source coding delay depends on the type of source codec used, and is typically in the range of 20 ms, as e.g. in GSM EFR (Global System for Mobile Communications) (Enhanced Full Rate), to approximately 50 ms, as e.g. in ITU-T standard G.718 (International Telecommunication Union-Telecommunication Standardization Sector).

One type of source codec, which is frequently used for both circuit switched (CS) and packet switched (ES) transmissions, is the AMR (Adaptive Multi Rate) Multi-mode codec. The AMR Multi-mode codec introduces a coding delay of 25 ms, of which 5 ms is a "lookahead" intended for enabling more efficient source coding. Thus, an AMR Multi-mode codec uses 25 ms of the available end-to-end delay. FIG. 1 illustrates the lookahead in an exemplary AMR codec. Each slot represents 5 ms. In this example of AMR encoder, each frame 106, 108, comprising speech data to be encoded, represents 4×5 ms=20 ms. In the signal analysis of the encoder, a 30 ms windowing frame 102, 104 is used. The windowing frame 104 extends 5 ms into the next frame of speech data, which 5 ms constitute the so-called lookahead 110.

The transmission delay, i.e. the part of an available end-to-end delay spent on the actual transmission through the communication system including, e.g. transmission through the radio access network and transport through the core network, depends largely on the access technology used and on the network configuration. Typically, there is a distinct difference between CS transmissions and PS transmissions, in terms of transmission delay. In CS transmissions, the transmission delay is well defined and fixed for each transported frame throughout the connection. In PS transmissions, on the other hand, each packet is transmitted individually and hence associated with an individual transmission delay, which gives rise to the known packet delay jitter, i.e. variations, in PS transmissions. That is, the packets in PS transmissions arrive at the receiver with different delay, some may arrive early, some late. For CS transmission, access techniques such as 3GPP (3rd Generation Partnership Project) GSM/Geran (GSM EDGE Radio Access Network, where EDGE stands for Enhanced Data rates for GSM Evolution) or UTRAN (UMTS Terrestrial Radio Access Network, where UMTS stands for Universal Mobile Telecommunications System), are used. For PS transmission, e.g. UTRAN PS bearers such as HSPA (High Speed Packet Access) and LTE (Long Term Evolution), are available. VoIP via Internet is also an example of PS transmission.

Even though there are a huge variety of access and transmission techniques available, it could generally be said that extending the available transmission delay budget will make a transmission more reliable, given a defined transmission cost. In other terms, by extending the available transmission delay, the transmission capacity may be significantly increased. For example, in an LTE access network, depending on the operating point in terms of delay and capacity, an increase of the available or allowed transmission delay of as little as 5 ms, may translate to capacity improvements of as much as 15%, regarding the amount of voice calls that can be accommodated in a cell. This is illustrated in FIG. 2, which shows how an increase of the transmission delay of x ms in an operating point P1 results in a capacity increase of $\Delta C_1$ users per cell. However, the same increase of the transmission delay in another operating point, P2, results in a capacity increase of $\Delta C_2$ users per cell, which is considerably smaller than $\Delta C_1$. Accordingly, the scarcity of time available for transmission may have a substantial limiting effect on transmission capacity.

The limitation of transmission capacity due to scarcity of available transmission time is thus identified as a problem.

SUMMARY

It would be desirable to enhance transmission efficiency in conversational services. It is an object of the invention to enable an increase of transmission capacity in conversational services. Further, it is an object of the invention to provide a method and an arrangement for extending the part of an available end-to-end delay budget, which could be used for transmission, in conversational services.

According to one aspect, a method is provided in a network node, for adapting a properly of source coding to the quality of a communication link in packet switched conversational services in a communication system. Within the method, information related to the quality of said communication link is obtained. A source coding mode with an associated source coding delay is selected, based on the obtained information and the associated source coding delay. There may for example be several selectable source coding modes having the same characteristics in terms of coding rate, but being associated with different coding delays. The selected source coding mode is to be used when source coding voice data to be transmitted over the communication link, and the source coding mode is selected from a set of source coding modes associated with different source coding delays.

According to another aspect, an arrangement is provided in a network node, and adapted to adapt a properly of source coding to the quality of a communication link in packet switched conversational services in a communication system. The arrangement comprises a functional unit adapted to obtain information related to the quality of a communication link. The arrangement further comprises a functional unit adapted to select a source coding mode with an associated source coding delay, based on the obtained information and the associated source coding delay. The selected source coding mode is to be used when source coding voice data to be transmitted over the communication link, and the source coding mode is selected from a set of source coding modes associated with different source coding delays.

The above method and arrangement may be used for, when needed, extending an available transmission delay budget in packet switched conversational services, by adding time, which is gained by selection of a source coding mode associated with a reduced coding delay, when source coding voice data.

The above method and arrangement may be implemented in different embodiments. In some embodiments the network node is a mobile terminal or other end-node, and in some embodiments, the network node is a central control node. In both cases, an indication of the selected source coding mode can be provided to one or more other network nodes. When the network node is an end-node, voice data to be transmitted over the communication link may be encoded in the network node using the selected source coding mode.

In some embodiments, the different selectable source coding modes may be associated with one source codec, and in other embodiments, some of the different selectable source coding modes may be associated with different source codecs, respectively.

In some embodiments, at least one of the different selectable source coding modes may be associated with an Adaptive Multi Rate, AMR, source codec, provided with at least one low-delay mode, wherein the encoding process in the at least one low-delay mode may be started without waiting for the lookahead buffer to be filled with valid samples. The at least one low-delay mode may be provided by modifying the shape of an IPC analysis window and/or shifting an IPC analysis window in time.

In some embodiments, at least one of the different selectable source coding modes may be associated with a scalable codec with a core coding layer and at least one enhancement coding layer where the different coding layers are associated with different inherent delays. When transmission of signals related to a layer being associated with a higher inherent delay is suspended, it may be refrained from delaying a signal related to a layer being associated with a low inherent delay, which is normally performed in order to synchronize it with signals related to a layer being associated with a higher inherent delay.

In some embodiments, different parameters may be determined based on the selected source coding mode, such as the duration of a time interval to be made available for retransmissions over the communication link; the number of retransmissions to be allowed over the communication link and/or the size of a jitter buffer to be used in a receiver of signals transmitted over the communication link. These alternatives are examples of how the "delay budget" gained from source coding can be made available for transmission.

In some embodiments, the obtained information related to the quality of the communication link concerns at least one of the parameters: the time spent on retransmissions over the communication link; the amount of retransmissions made of packets over the communication link; the amount of packets lost in transmission over the communication link; the amount of corrupt or unusable packets received over the communication link, and a predetermined change in one of the above listed parameters.

In some embodiments a source coding mode associated with a relatively low source coding delay may be selected when the quality of the communication link is determined to be bad, and a source coding mode associated with a relatively high source coding delay may be selected when the quality of the communication link is determined to be good.

The above features, which could be combined in different embodiments have basically been described in terms of actions. However, the described arrangement allows corresponding embodiments, where different functional units are adapted to carry out the above described features and actions.

BRIEF DESCRIPTION OF DRAWINGS

The invention will now be described in more detail by means of exemplary embodiments and with reference to the accompanying drawings, in which.

DETAILED DESCRIPTION

Briefly described, a method and an arrangement are provided that can be used for extending an available transmission delay budget in packet switched conversational services, by adding time, which is gained from reducing a delay used for source coding of voice data. The source coding delay is reduced by providing a set of selectable source coding modes associated with different coding delays, and adaptively selecting a source coding mode associated with a coding delay that optimizes a tradeoff between source coding efficiency and transmission efficiency, given a certain estimated channel quality. The objective is to enable transmission capacity enhancements at a given average level of voice service quality, or, voice service quality enhancements at a given level of transmission capacity, or both.

SOME DEFINITIONS

Within this document, some expressions will be used when discussing the procedure of adapting a property of source coding to the quality of a communication link, of which some will be briefly defined here.

The term "source coding delay" refers to the amount of time a source coding algorithm for, e.g., voice data, requires for its operation. This algorithmic source coding delay is the time it takes for an input sample being fed into the encoder until it is reproduced by the decoder, excluding the time needed for computations or transmissions of coded speech data between encoder and decoder. This delay can be caused by the encoder for buffering a part of the input signal required for the coding algorithm to operate. It can also be caused by the decoder for e.g. buffering coded speech data before speech samples can be reconstructed.

The term "transmission delay" here generally refers to the time between source coding and source decoding, i.e. the time spent on, e.g. packetizing, channel coding, interleaving, retransmissions and jitter buffering.

Generally, when referring to an allowed amount of delay, e.g. source coding delay or transmission delay, the term "delay budget", is used.

The term "codec" is used in its conventional meaning, i.e. as referring to an encoder and/or decoder.

Channel conditions are referred to as being "good" or "bad". There is no strict definition of a "good" or "bad" channel, since it depends, e.g. on what quality level is desired or could be accepted. The channel conditions typically relate to the transmission channel quality which can be described by e.g. packet or frame erasure rates, the amount of packet delay jitter, bit error rates, carrier to interference or noise ratios, etc. Thus, a "good channel" could be interpreted as a channel having a certain desired or acceptable quality, whilst a "bad channel" could be interpreted as a channel having an undesired, i.e. too low, or unacceptable quality.

Figure 3A:
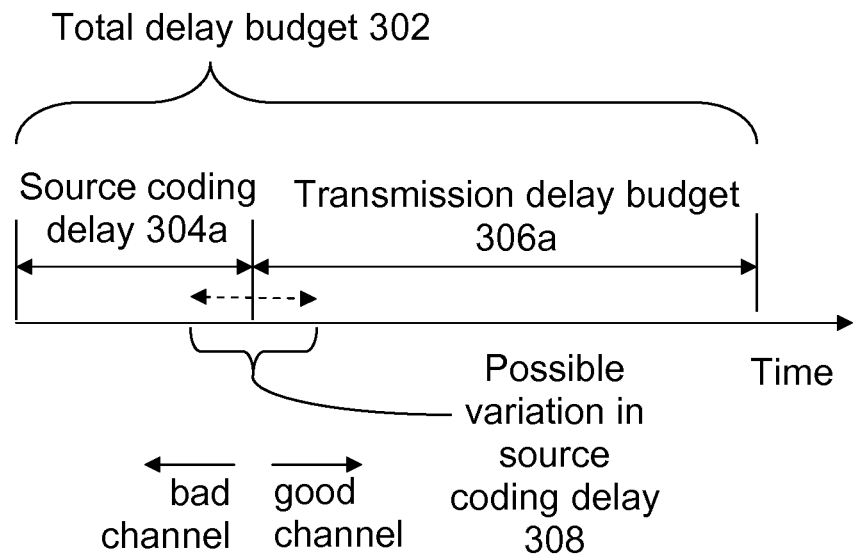
FIGS. 3a-c are schematic views illustrating adaption of source coding delay to channel conditions, according to an embodiment.
Figure 3B:
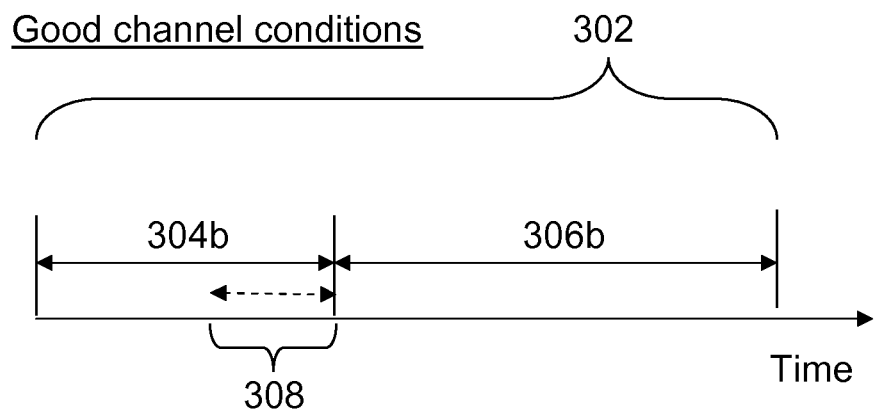
Figure 3C:
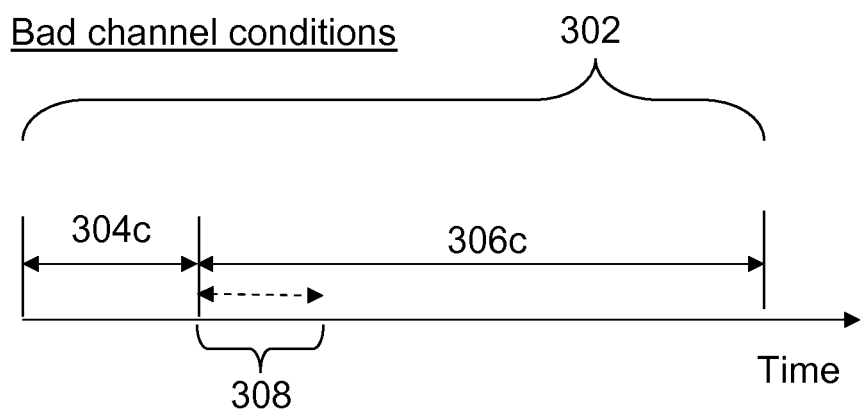

In exemplary embodiments of the invention, illustrated in FIGS. 3a-c, source coding delay 304a is adapted 308 to channel conditions, and traded against transmission delay budget 306a. When channel conditions are determined to be good, a reliable transmission can be achieved without extending a transmission delay budget 306b. Thus, during good channel conditions, illustrated in FIG. 3b, delay is better spent in a source codec, in order to improve the data compression ratio. On the other hand, when channel conditions are determined to be bad, illustrated in FIG. 3c, relatively more gain can be achieved by spending more of an available end-to-end delay budget 302 on transmission, e.g. by increasing the number of allowed re-transmissions in an H-ARQ (Hybrid Automatic Repeat reQuest) protocol, or by increasing a jitter buffer length, or, by using longer and more efficient channel codes or longer interleaving, in exchange for spending less delay in the source codec, all at the price of only slightly sacrificing the source coding efficiency.

It is here assumed that a receiver deploys a jitter buffer that compensates for delay jitter of received speech data packets. An important insight is that a jitter buffer is also very suitable for compensating for changes in source coding delay. The jitter buffer, if properly dimensioned, makes it possible to perform speech coding delay changes without causing discontinuities in the reconstructed speech signal. This is possible considering the Internet Engineering Task Force (IEIF) Real Transport Protocol (RTF), RFC 3550 (Request For Comments), which is typically used for PS conversational voice transmissions. This protocol provides each packet with a timestamp, which indicates the sampling instant of the first voice sample transported by the packet. Hence, regardless of the delay spent on source coding or transmission, the timestamp information provides the exact time location of the reconstructed voice segment in relation to the voice segments represented by the other transported packets. If only the jitter buffer is sufficiently deep such that no buffer overflow or underflow occurs, then a change in coding delay is simply handled as any other delay jitter caused by the transmission.

Figure 1:
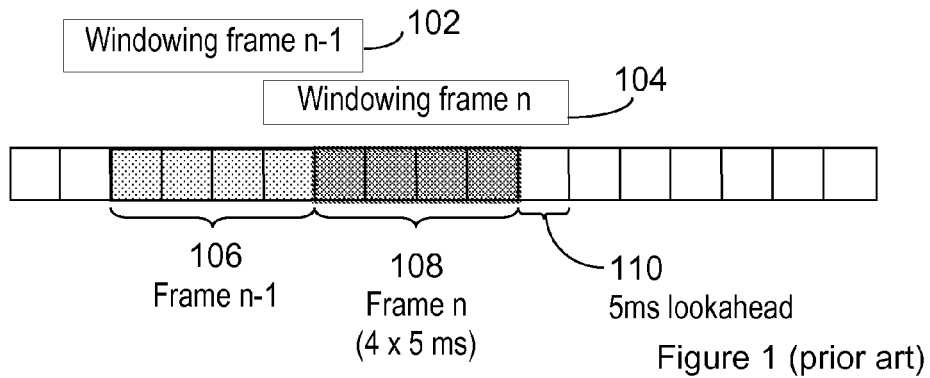
FIG. 1 is a schematic view illustrating lookahead in an AMR codec according to the prior art.
Figure 2:
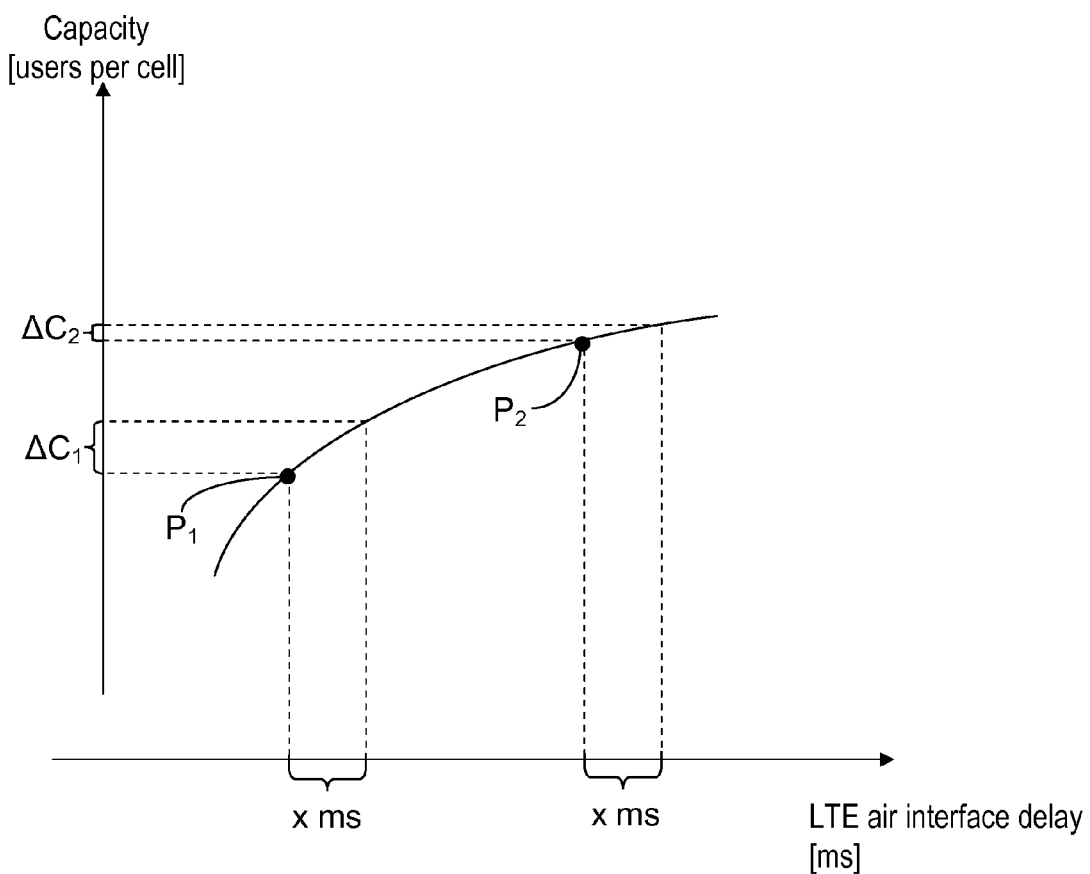
FIG. 2 is a diagram illustrating the LTE system capacity as a function of LTE air interface delay, according to the prior art.

An observation relevant for the invention is that the AMR Multi-mode codec in a PS scenario makes the same contribution of 25 ms to an end-to-end delay for all codec modes, even though one of the modes, MR1 22, does not make use of all 25 ms for source coding. While modes MR1 0.2 and downwards, i.e. lower coding rates, make use of the lookahead of 5 ms, illustrated in FIG. 1, for more efficient source coding, mode MR1 22 leaves the lookahead unused for source compression. In the mode MR1 22, the lookahead of 5 ms is only used for VAD (Voice Activity Detection). Thus, in an AMR encoder operating in mode MR1 22 today, an input signal frame is not processed until the lookahead buffer is filled with valid speech samples. This wait is motivated in AMR applications for CS speech transmissions, where the transmission time instances are constraint to occur regularly every 20 ms, and where mode switches between AMR modes can occur only at any 20 ms border. However, PS transmissions do not work under the same constraints. In PS transmissions, as described above, each voice packet is associated with a timestamp. Hence, there is no need to wait and transmit the packets only at pre-defined transmission times, as is being done in CS systems. Rather, as soon as the coded voice data to be transmitted with a packet is available, it can be transmitted. Hence, coded voice data that is encoded with AMR mode MR1 22 can be transmitted 5 ms earlier compared to voice packets containing voice data encoded with other AMR modes.

Delay is an important attribute of efficient transmission and can either be used for more efficient source coding, i.e. a better compression efficiency, or for improved resilience to transmission errors, as previously mentioned. It can be considered suboptimal to keep the source coding delay, being a component of the end-to-end delay, fixed under all transmission conditions, as is the case in current speech transmission systems. This should be seen in view of the fact that many applications adapt the channel coding delay in response to the transmission system configuration and condition.

The inventive concept can be applied to both traditional codecs, such as AMR codecs, and in the development of new codecs.

In one AMR related embodiment of the invention, the processing of an input signal speech frame is immediately started when a sufficient amount of input signal samples are available. For the encoding mode MR1 22, this implies that the encoding process is started without waiting for the lookahead buffer to be filled with valid samples, i.e. the encoding process starts, and finishes, 5 ms earlier as compared to conventional use. Thereby, the transmission can be started 5 ms earlier than in conventional use. The 5 ms thus obtained from the source coding can be used in a variety of ways for enhancing the transmission efficiency in real-time applications involving PS transmission of speech. It should be noted that this approach may require a modification of the VAD algorithm in the AMR codec, which however does not conflict with the general idea of the invention.

In one embodiment related to new codecs or conventional codecs other than AMR codecs, a voice codec is provided with at least two modes. One of these modes is a low delay mode, with e.g. 20 ms delay, typically operated at a low bit rate of e.g. 8 kbps. Given the low rate and delay, this mode provides decent but not extraordinary voice quality. A second mode, of the at least two modes, is a high-rate high quality mode, operated at e.g. 16 or 24 kbps having a coding delay of e.g. 40 ms. Whenever the channel conditions are estimated to be good, there is no need for an extended transmission delay budget, and the available delay is better spent on operating the high quality codec mode associated with the higher coding delay. However, when the channel conditions degrade it is better to switch to the low-rate codec mode, which, due to the lower coding delay, allows for spending more delay for the transmissions, which in turn makes them more robust and more efficient.

In one embodiment, the remaining part of the transmission chain, i.e. after the source codec, is not modified at all. In this embodiment, transmission gain will be obtained from the mere fact that there is more time available for the transmission of a speech packet to a receiver. Due to the increase in available transmission time, the likelihood of late losses, i.e. when a speech packet arrives too late at a receiver to be used for decoding, will be reduced, and hence the speech quality will be increased without spending any more transmission resources.

In embodiments for systems applying retransmission protocols, e.g. an H-ARQ protocol with retransmissions using incremental redundancy, an additional amount of milliseconds of transmission time, e.g. the AMR related 5 ms, can be used for increasing the delay budget for retransmissions and hence allow for an increased number of retransmissions. Such an increase will result in a more reliable transmission, given the same transmission resource usage, e.g. bandwidth. Alternatively, the transmission resource usage can be reduced, while still keeping the same transmission reliability, e.g. QoS level (Quality of Service). Thus, the additional number of milliseconds can be used either for enhancement of speech quality, or for transmission system capacity enhancements, or both. It is worth pointing out that the quality and/or capacity gain is achieved without any increase in computational complexity.

Further, alternative low-delay encoder operation modes, not using lookahead, could be provided in speech codecs, in addition to the conventional modes using lookahead in the encoding process. In AMR codecs, low-delay variants of the existing AMR modes, e.g. MR1 0.2, can be achieved by modifying the LPC (Linear Predictive Coding) analysis window such that less, or none at all, lookahead will be used in the encoding process. The choice whether to use the regular or low-delay encoder variants could be either fixed, i.e. for some of the modes the low delay variants are used, or adaptive. One adaptation possibility is to decide at call setup which variant of a mode to use, e.g. based on capacity or load statistics of the radio access network. In case high traffic load is likely to occur, the low-delay variant could be selected in order to help maximizing system capacity. A further adaptation possibility is to allow switching between a low-delay variant and the original version of a mode online during a call, based on actual channel condition estimates obtained from the receiving terminal or some control entity of the radio network. The low-delay operation mode alternatives can then be used for more efficient transmission at bad channel conditions, as outlined above. A shortening of the IPC analysis window will come at the price of slightly reduced intrinsic quality of the respective low-delay e.g. AMR codec mode. However, this quality reduction will be compensated for by the quality gain due to the increased capability to deal with the bad channel conditions.

In order to ensure that the best possible speech quality is achieved at approximately all times, the source coding delay, i.e. the selection of source codec mode, should be adapted to current channel conditions. For example, when channel conditions are determined to be relatively good, and when no extra delay for transmission enhancements is needed, the source codec may operate in a regular mode using encoder lookahead. However, when channel conditions are determined to be relatively bad, and when it is determined that a resulting gain from access to additional time for transmission exceeds a certain quality loss due to e.g. a reduction of the IPC analysis window, a low-delay source codec mode is selected. Such an adaptation would require the transmission of adaptation data from a receiving end to a transmitting end. The adaptation data could comprise channel measurement data, e.g. packetloss rates, and/or may comprise a request for a certain codec mode. In case of low packetloss rate, the regular encoding mode with look ahead could be selected and/or requested. Incase of high packetloss rate, the low-delay encoding mode could be selected and/or requested.

Further, the allowed number of H-ARQ re-transmissions could be adapted in direct response to a selected coding delay, or to a selected encoding mode that is associated with a certain coding delay. For example, when a source codec operates in a "low-delay" mode, the maximum number of allowed retransmissions in the H-ARQ protocol is preferably set to a higher number than when the encoder operates in a "high-delay" mode. Such a direct control of the H-ARQ protocol may not always be possible or desirable, as it requires that the MAC (Media Access Control) layer receives an indication of which delay or mode that is used by the encoder. However, in case of the uplink transmission from a mobile phone to the network, where an IP stack is implemented in the same physical mobile phone device, such direct control of the H-ARQ uplink protocol is clearly feasible. Here, the detection of the coding delay could be facilitated based on the codec mode used or through inspection of the timestamp of the RTP packets from which a change in coding delay is easily detectable. In case of the H-ARQ protocol used for downlink transmissions, this kind of adaptation based on inter-layer communication is also possible, though may be considered to involve undue effort and hence be undesired.

However, such interlayer communication may be avoided by the use of feedback to the encoding-end from a receiving-end. For example, an adaptation of the source codec mode to channel conditions will ensure that an original "high-delay" mode, with lookahead, is used in a source codec during good channel conditions. Further, the delay caused by H-ARQ retransmissions will be short when channel conditions are good. Then, when the channel deteriorates, the delay caused by H-ARQ retransmissions will increase, which can be detected by the receiver. Thus, a certain detected increase of the time spent on retransmissions, and/or the number of received re-transmissions, and/or a certain detected increase of the amount of lost packets, can be used as a criterion for deciding to use a low-delay encoder mode without lookahead. Initially, e.g. at session set-up, the number of allowed re-transmissions in the H-ARQ protocol could be set to a higher number, matching the low-delay source coding. The IETF RTP control protocol (RTCP) that is specified as a part of the RFC 3550 provides the necessary protocol elements facilitating the transmission of feedback information to the encoding-end from a receiving-end.

A similar codec delay adaptation strategy is possible with codecs that inherently have more than one coding delay option. An example of such a codec is a scalable codec such as G.718 with an ACELP (Algebraic Code Excited Linear Prediction) core layer and an MDCT (Modified Discrete Cosine Transform) enhancement layer. Typically, the ACELP layer requires less coding delay than the MDCT enhancement layer. In order to synchronize the layers, the ACELP layer signal is delayed in the decoder, such that it will have the same delay as the reconstructed MDCT enhancement layer signal. Such introduction of extra delay with the purpose of synchronizing the layers can be seen as a similar waste of a part of the delay budget as with the unused lookahead delay of the AMR mode MR1 22. This delay would be better spent if made available to increase the transmission delay budget. According to one embodiment, the above described codec and similar codec types may be adapted as follows:

When channel conditions are determined to be good, speech is source coded for transmission using both core and enhancement layers. The source decoding in the receiving-end is then performed using an original high-delay speech decoder mode that delays the ACELP core layer signal in order to synchronize it with the enhancement layer reconstruction signal. When channel conditions are determined to be bad, the transmission of enhancement information, e.g. MDCT related information, is suspended, and only core layer information is sent. Thus, when channel conditions are determined to be bad, instead of delaying the decoded ACELP layer signal in the decoder, which is the case today, the time conventionally used for layer synchronization may instead be used e.g. in the H-ARQ protocol, for enabling further retransmissions, or in the receiver jitter buffer, of which the length can be increased accordingly. The configuration of when to use the different decoding delays could be made e.g. at setup, or be changed adaptively during a session.

It should be pointed out that the described adaptation between source coding with a longer delay and a corresponding shorter transmission delay on good channels, and source coding with shorter delay and corresponding longer transmission delay on bad channels, could also be generalized to switching between completely different source codecs, which are not related to each other. For example, an audio codec associated with a long coding delay could be used when channel conditions are determined to be good, and a speech codec associated with a relatively shorter coding delay could be used when channel conditions are determined to be bad. The coding delay difference could then be made available for, e.g. channel coding when channel conditions are determined to be bad, or, as in the embodiment above, in the H-ARQ protocol, for enabling further retransmissions, or in the receiver jitter buffer, in which the buffer length can be increased accordingly.

Figure 4:
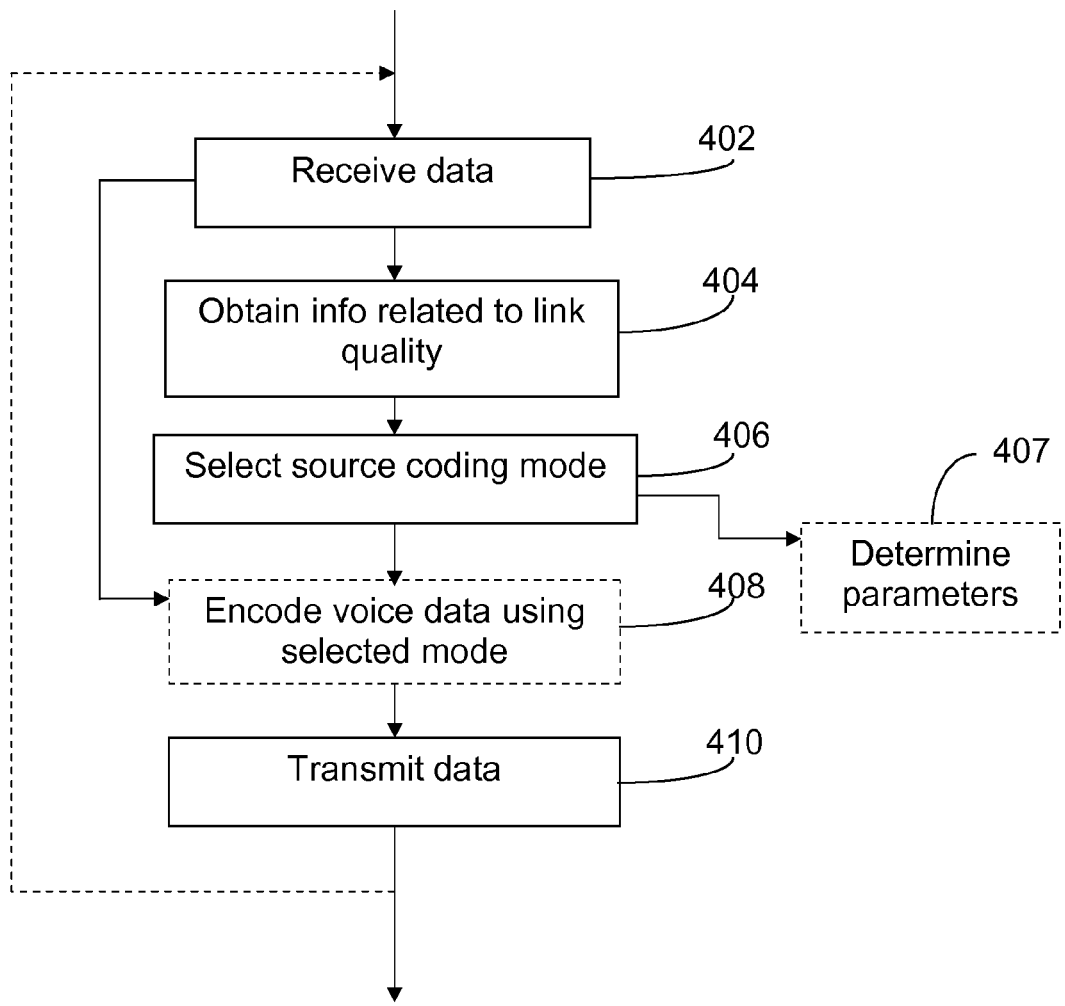
FIG. 4 is a flow chart illustrating procedure steps according to an embodiment.

An embodiment of the procedure of adapting a properly of source coding to the quality of a communication link will now be described with reference to FIG. 4. Initially, data is received in a step 402. Depending on whether the procedure is applied in an end-node or in a central control node, the received data could either be voice data to be source coded before transmission, or information related to voice data to be source coded.

Information related to the quality of a communication link, is obtained in a step 404. The information could be obtained e.g. by performing measurements on transmissions received over the communication link, receiving reports of the quality of the communication link from another network entity, or by using any other suitable method. Then, a source coding mode is selected from a set of at least two source coding modes, in a step 406, based on the information obtained in step 404. This can be done by comparing a value representing the quality information obtained in step 404 with a predetermined threshold. The codec mode with low delay is selected when this value is below the threshold, otherwise, the other mode is selected. The different source coding modes in the set are associated with different source coding delays, and the selection of a source coding mode from the set concerns selecting a desired source coding delay in order to match the quality of the communication link. When the procedure is applied in an end-node, which is to encode received voice data, the received voice data is encoded, using the selected source coding mode, in a step 408, and the source encoded voice data is then transmitted to another network node in a step 410. When the procedure is applied in a central control node or in an end-node, which is, e.g., to receive the encoded voice data after transmission over the communication link, an indication of the selected source coding mode is provided to one or more other network-nodes in the step 410.

The procedure may further comprise a step 407 of determining e.g. a duration of a time interval to be made available for retransmissions, and/or a number of retransmissions to be allowed over the communication link when using the selected source coding mode, and/or a size of a jitter buffer to be used in a receiver of signals transmitted over the communication link, based on the selected source coding mode. The determined parameters are then provided to the network nodes concerned, for use during transmission of speech, source coded using the selected source coding mode, over the communication link in a conversational service.

Below, an exemplary arrangement 500, adapted to enable the performance of the above described procedure in a network entity, will be described with reference to FIG. 5. The arrangement 500 comprises a receiving unit 502, which is adapted to receive signals transmitted from other network entities and/or signals arriving to the network entity in the form of sound waves, depending on whether the arrangement 500 is provided in an end-node or in a central control node. The arrangement 500 further comprises a quality unit 504, adapted to obtain information related to the estimated quality of a communication link. The information could e.g. be derived from measurements on transmissions received over the communication link, or from reports of the quality of the communication link, received from another network entity, or by using any other suitable method. The arrangement 500 further comprises a selecting unit 506, adapted to select a source coding mode from a set of at least two source coding modes associated with different coding delays, based on information obtained in the quality unit 504. When the arrangement is to be provided in an end-node, it further comprises a source coding unit 508, adapted to source encode received voice data using the source coding mode selected by the selecting unit 506. The source coding unit 508 could comprise e.g. one or more source codecs or one codec with the above different codec modes, with different delays. The arrangement 500 further comprises a transmitting unit 510. In an end-node, the transmitting unit 510 is adapted to transmit encoded voice data over the communication link and/or to provide an indication of the selected source coding mode to one or more other network nodes. In a central control node, the transmitting unit 510 is adapted to provide an indication of the selected source coding mode to one or more other network nodes.

The arrangement 500 may further comprise a determining unit 507, adapted to determine e.g. at least one of: a duration of a time interval to be made available for retransmissions over the communication link; a number of retransmissions to be allowed over the communication link; and a size of a jitter buffer to be used in a receiver of signals transmitted over the communication link, based on the selected source coding mode. The determined parameters are then provided to the network nodes or functional units concerned, which is schematically illustrated by a dashed arrow from unit 507.

Figure 5:
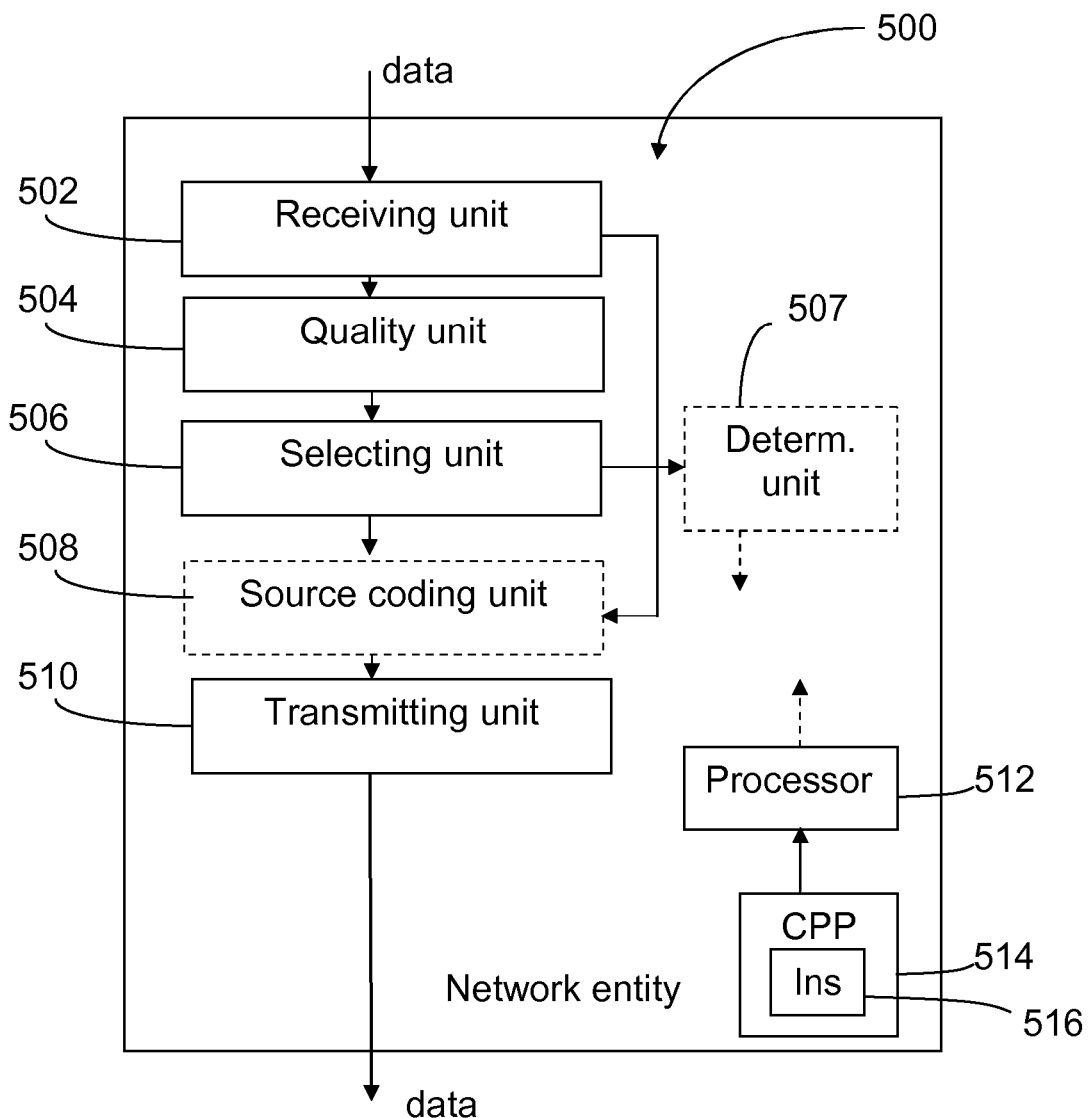
FIG. 5 is a block diagram illustrating an embodiment of an arrangement in a radio transmitting entity.

In FIG. 5 is also illustrated a computer program product (CPP) 514 which comprises instructions 516, which when executed by a processor 512, or similar, will cause the units 504-510 to perform their tasks according to an embodiment of the described procedure. Connections between the processor 512 and the units 504-510 are schematically illustrated by a dashed arrow from 512.

It should be noted that FIG. 5 merely illustrates various functional units of the arrangement 500 in a logical sense. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). Thus, the invention is generally not limited to the shown structure of the arrangement 500.

Figure 6A:
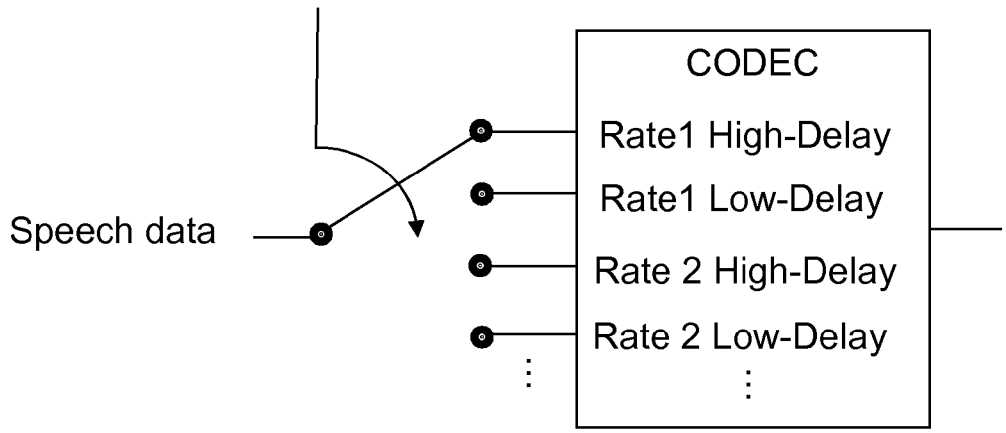
FIGS. 6a-c are schematic views illustrating different exemplary embodiments of selectable codec modes associated with different coding delay.
Figure 6B:
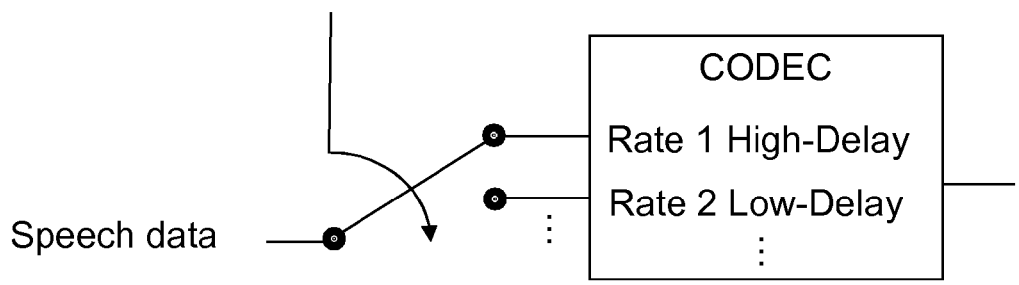
Figure 6C:
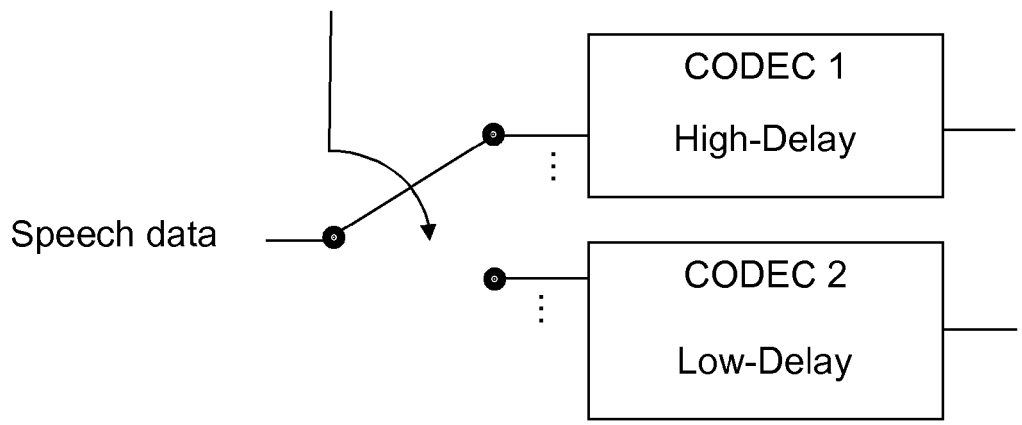

Different exemplary embodiments of selectable codec mode compositions are illustrated in FIGS. 6a-c. FIG. 6a shows a codec according to one embodiment, having more than one codec mode per coding rate, at least one being associated with a high coding delay, and at least one being associated with a low coding delay. FIG. 6b shows a codec according to one embodiment, where each codec mode is associated with a different coding rate and a different coding delay. FIG. 6c shows an embodiment where different coding delays are associated with different codecs, each having modes with different coding rates. Alternatively, the illustrated embodiments could be varied and/or combined in different ways. The number of possible selectable coding delays is obviously not limited to the two alternatives "high" and "low", which are used here for the sake of simplicity.

An exemplary advantage of the above embodiments is that source coding delay can be traded for transmission delay, which enables making transmission over low quality channels more reliable than what is possible today and which in turn may lead to system capacity enhancements.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention is generally defined by the following independent claims.

The invention claimed is:

1. A method in a network node, for adapting a property of source coding to the quality of a communication link in packet switched conversational services in a communication system, the method comprising:
   obtaining information related to the quality of said communication link,
   selecting a source coding mode with an associated source coding delay, based on the obtained information and the associated source coding delay,
   wherein the selected source coding mode is to be used when source coding voice data to be transmitted over the communication link, and
   wherein the source coding mode is selected from a set of source coding modes associated with different source coding delays.

2. The method according to claim 1, wherein the network node is a mobile terminal or other end-node in a conversational session.

3. The method according to claim 1, wherein the network node is a central control node.

4. The method according to claim 2, further comprising encoding voice data to be transmitted over the communication link using the selected source coding mode.

5. The method according to claim 1, further comprising:
   providing an indication of the selected source coding mode to one or more other network nodes.

6. The method according to claim 1, wherein the different selectable source coding modes are associated with one source codec, and/or, with different source codecs, respectively.

7. The method according to claim 1, wherein at least one of the different selectable source coding modes is associated with an Adaptive Multi Rate, AMR, source codec, provided with at least one low-delay mode.

8. The method according to claim 7, wherein the encoding process in the at least one low-delay mode is started without waiting for the lookahead buffer to be filled with valid samples.

9. The method according to claim 7, wherein the at least one low-delay mode is provided by at least one of: modifying the shape of an LPC analysis window; and shifting an LPC analysis window in time.

10. The method according to claim 1, wherein at least one of the different selectable source coding modes is associated with a scalable codec with a core coding layer and at least one enhancement coding layer, the different coding layers being associated with different inherent delays.

11. The method according to claim 10, wherein a signal related to a layer being associated with a low inherent delay is not delayed to be synchronized with signals related to a layer being associated with a higher inherent delay, when transmission of signals related to a layer being associated with a higher inherent delay is suspended.

12. The method according to claim 1, further comprising:
   determining at least one of the following, based on the selected source coding mode:
   the duration of a time interval to be made available for retransmissions over the communication link,
   the number of retransmissions to be allowed over the communication link, and
   the size of a jitter buffer to be used in a receiver of signals transmitted over the communication link.

13. The method according to claim 1, wherein the obtained information related to the quality of the communication link concerns at least one of the following parameters:
   the time spent on retransmissions over the communication link,
   the amount of retransmissions made of packets over the communication link,
   the amount of packets lost in transmission over the communication link,
   the amount of corrupt or unusable packets received over the communication link,
   a predetermined change in one of the above listed parameters.

14. The method according to claim 1, wherein a source coding mode associated with a relatively low source coding delay is selected when the quality of the communication link is determined to be bad.

15. The method according to claim 1, wherein a source coding mode associated with a relatively high source coding delay is selected when the quality of the communication link is determined to be good.

16. An arrangement in a network node, adapted to adapt a property of source coding to the quality of a communication link in packet switched conversational services in a communication system, the arrangement comprising:
   a quality unit, adapted to obtain information related to the quality of a communication link,
   a selecting unit, adapted to select a source coding mode with an associated source coding delay, based on the obtained information and the associated source coding delay,
   wherein the selected source coding mode is to be used when source coding voice data to be transmitted over the communication link, and wherein the source coding mode is selected from a set of source coding modes associated with different source coding delays.

17. The arrangement according to claim 16, wherein the network node is a mobile terminal or other end-node.

18. The arrangement according to claim 16, wherein the network node is a central control node.

19. The arrangement according to claim 17, further comprising a source coding unit, adapted to encode voice data to be transmitted over the communication link using the selected source coding mode.

20. The arrangement according to claim 16, further adapted to provide an indication of the selected source coding mode to one or more other network nodes.

21. The arrangement according to claim 16, wherein the different selectable source coding modes are associated with one source codec, and/or, with different source codecs, respectively.

22. The arrangement according to claim 16, wherein at least one of the different selectable source coding modes is associated with an Adaptive Multi Rate, AMR, source codec, provided with at least one low-delay mode.

23. The arrangement according to claim 22, wherein the AMR source codec is adapted to start the encoding process in the at least one low-delay mode without waiting for the lookahead buffer to be filled with valid samples.

24. The arrangement according to claim 22, wherein the at least one low-delay mode is provided by at least one of: modifying the shape of an LPC analysis window; and shifting an LPC analysis window in time.

25. The arrangement according to claim 16, wherein at least one of the different selectable source coding modes is associated with a scalable source codec with a core coding layer and at least one enhancement coding layer, the different coding layers being associated with different inherent delays.

26. The arrangement according to claim 25, wherein the scalable source codec is adapted to refrain from delaying a signal, related to a layer being associated with a low inherent delay, for it to be synchronized with signals related to a layer being associated with a higher inherent delay, when transmission of signals related to a layer being associated with a higher inherent delay is suspended.

27. The arrangement according to claim 16, further comprising:
a determining unit, adapted to determine at least one of the following, based on the selected source coding mode:
the duration of a time interval to be made available for retransmissions over the communication link,
the number of retransmissions to be allowed over the communication link, and
the size of a jitter buffer to be used in a receiver of signals transmitted over the communication link.

28. The arrangement according to claim 16, wherein the quality unit is adapted to obtain information concerning at least one of the following parameters:
the time spent on retransmissions over the communication link,
the amount of retransmissions made of packets over the communication link,
the amount of packets lost in transmission over the communication link,
the amount of corrupt or unusable packets received over the communication link, and
a predetermined change in one of the above listed parameters.

29. The arrangement according to claim 16 wherein the selecting unit is adapted to select a source coding mode associated with a relatively low source coding delay when the quality of the communication link is determined to be bad.

30. The arrangement according to claim 16, wherein the selecting unit is adapted to select a source coding mode associated with a relatively high source coding delay when the quality of the communication link is determined to be good.

* * * * *

UNITED STATES PATENT AND TRADEMARK OFFICE
CERTIFICATE OF CORRECTION

PATENT NO. : 8,898,060 B2  
APPLICATION NO. : 13/582122  
DATED : November 25, 2014  
INVENTOR(S) : Bruhn Page 1 of 1

It is certified that error appears in the above-identified patent and that said Letters Patent is hereby corrected as shown below:

Specification

In Column 1, Line 53, delete "(ES)" and insert -- (PS) --, therefor.

In Column 2, Line 57, delete "properly" and insert -- property --, therefor.

In Column 3, Line 5, delete "properly" and insert -- property --, therefor.

In Column 3, Line 46, delete "IPC analysis window and/or shifting an IPC" and insert -- LPC analysis window and/or shifting an LPC --, therefor.

In Column 4, Line 26, delete "in which" and insert -- in which: --, therefor.

In Column 5, Line 55, delete "(IEIF)" and insert -- (IETF) --, therefor.

In Column 5, Line 56, delete "(RTF)," and insert -- (RTP), --, therefor.

In Column 7, Line 53, delete "IPC" and insert -- LPC --, therefor.

In Column 8, Line 2, delete "IPC" and insert -- LPC --, therefor.

In Column 9, Line 40, delete "properly" and insert -- property --, therefor.

Signed and Sealed this
Eighth Day of March, 2016

Michelle K. Lee
*Director of the United States Patent and Trademark Office*